United States Patent
Yi et al.

(10) Patent No.: US 9,516,512 B2
(45) Date of Patent: Dec. 6, 2016

(54) METHOD AND APPARATUS FOR SUPPORTING A CONTROL PLANE AND A USER PLANE IN A WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Hanbyul Seo, Seoul (KR); Bonghoe Kim, Seoul (KR); Dongyoun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/430,134

(22) PCT Filed: Sep. 25, 2013

(86) PCT No.: PCT/KR2013/008580
§ 371 (c)(1),
(2) Date: Mar. 20, 2015

(87) PCT Pub. No.: WO2014/051333
PCT Pub. Date: Apr. 3, 2014

(65) Prior Publication Data
US 2015/0289144 A1    Oct. 8, 2015

Related U.S. Application Data

(60) Provisional application No. 61/705,596, filed on Sep. 25, 2012, provisional application No. 61/756,472, filed on Jan. 25, 2013.

(51) Int. Cl.
*H04W 16/18* (2009.01)
*H04W 36/22* (2009.01)
(Continued)

(52) U.S. Cl.
CPC ............. *H04W 16/18* (2013.01); *H04W 24/10* (2013.01); *H04W 36/22* (2013.01); *H04W 72/042* (2013.01)

(58) Field of Classification Search
CPC .................................................... H04W 16/18
See application file for complete search history.

(56) References Cited

U.S. PATENT DOCUMENTS

2010/0222055 A1    9/2010  Cho et al.
2011/0194495 A1*   8/2011  Seo ...................... H04W 16/12
                                                              370/328

(Continued)

FOREIGN PATENT DOCUMENTS

KR        10-1006796        1/2011
KR      10-2012-0042261     5/2012
WO        2010/126344      11/2010

OTHER PUBLICATIONS

PCT International Application No. PCT/KR2013/008580, Written Opinion of the International Searching Authority dated Jan. 17, 2014, 1 page.

*Primary Examiner* — John Blanton
(74) *Attorney, Agent, or Firm* — Lee Hong Degerman Kang Waimey

(57) ABSTRACT

A method for and apparatus for supporting a control plane (C-plane) and user plane (U-plane) in a wireless communication system supporting multiple carriers is provided. A wireless device receives a signal to initiate inter-frequency measurement from a macro cell, performs the inter-frequency measurement, and determines to configure a small cell for data transmission based on the inter-frequency measurement. And, this invention includes that a C-Plane and a U-Plane split over different carriers are existed and operated more accurately and efficiently.

13 Claims, 11 Drawing Sheets

(51) Int. Cl.
*H04W 24/10* (2009.01)
*H04W 72/04* (2009.01)

(56) References Cited

U.S. PATENT DOCUMENTS

| | | | |
|---|---|---|---|
| 2012/0039199 A1* | 2/2012 | Chen | H04L 1/0027 370/252 |
| 2012/0236977 A1 | 9/2012 | Zou et al. | |
| 2012/0269172 A1* | 10/2012 | Chin | H04W 36/32 370/332 |
| 2013/0021996 A1* | 1/2013 | Wang | H04W 72/082 370/329 |
| 2014/0044003 A1* | 2/2014 | Drazynski | H04W 24/10 370/252 |
| 2014/0200016 A1* | 7/2014 | Siomina | H04W 24/08 455/450 |
| 2015/0131569 A1* | 5/2015 | Rosa | H04W 72/042 370/329 |

* cited by examiner

METHOD AND APPARATUS FOR SUPPORTING A CONTROL PLANE AND A USER PLANE IN A WIRELESS COMMUNICATION SYSTEM

CROSS-REFERENCE TO RELATED APPLICATIONS

This application is the National Stage filing under 35 U.S.C. 371 of International Application No. PCT/KR2013/008580, filed on Sep. 25, 2013, which claims the benefit of U.S. Provisional Application Ser. Nos. 61/705,596, filed on Sep. 25, 2012 and 61/756,472, filed on Jan. 25, 2013, the contents of which are all hereby incorporated by reference herein in their entirety.

TECHNICAL FIELD

The present invention relates to wireless communications, and more particularly, to a method and apparatus for supporting a control plane (C-plane) and a user plane (U-plane) in a wireless communication system supporting multiple carriers.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. For example, exchanging ACK (Acknowledgement)/NACK (Non-Acknowledgement) information for performing HARQ (Hybrid Automatic Repeat reQuest), controlling power of the HARQ, and the like, are required. Also an efficient cell planning for multi-CCs is required.

DISCLOSURE

Technical Problem

The present invention provides a method and apparatus for supporting a control plane (C-plane) and a user plane (U-plane) in a wireless communication system supporting multiple carriers.

The present invention also provides a method and apparatus for supporting dual connectivity in a wireless communication system supporting multiple carriers.

The present invention also provides a method and apparatus for transmitting data with cell planning for a load balance in a wireless communication system supporting multiple carriers.

Technical Solution

In an aspect, a method for supporting a control plane (C-plane) and a user plane (U-plane) in a wireless communication system supporting multiple carriers is provided. The method may include receiving a signal to initiate inter-frequency measurement from a macro cell, performing the inter-frequency measurement, and determining to configure a small cell for data transmission based on the inter-frequency measurement.

The method may further include configuring that the macro cell for the C-plane is aggregated as a primary serving cell (PCell), and configuring that the small cell for the U-plane is aggregated as a secondary serving cell (SCell), wherein the PCell and the SCell are connected via X2 or Xa interface.

The method may further include configuring a measurement object for the inter-frequency measurement from the signal, and triggering the inter-frequency measurement by receiving a downlink control information (DCI) through a physical downlink control channel (PDCCH) or optionally an Enhanced PDCCH (EPDDCH).

In another aspect, a wireless device for supporting a control plane (C-plane) and a user plane (U-plane) in a wireless communication system supporting multiple carriers is provided. The wireless device includes a radio frequency unit for receiving a radio signal, and a processor, operatively coupled with the radio frequency unit, configured to receive a signal to initiate inter-frequency measurement from a macro cell, perform the inter-frequency measurement, and determine to configure a small cell for data transmission based on the inter-frequency measurement. Wherein the macro cell for the C-plane is aggregated as a primary serving cell (PCell), and the small cell for the U-plane is aggregated as a secondary serving cell (SCell), wherein the PCell and the SCell are connected via X2 or Xa interface.

Advantageous Effects

This invention provides that the at least two serving cells with different coverage can be used for data transmission. More details, this invention can be included that a C-Plane and a U-Plane are split over different carriers, for example, the C-Plane is over a macro-cell layer, and the U-Plane is over a small-cell layer and the macro and the small cell are not co-site.

Therefore, this invention may keep the benefit of macro coverage in terms of hand-over & coverage, boost data throughput by localizing data transmission, and offload heavy load from the macro-cell. So it can offer better Quality of Experience (QoE) on UEs in particular cell-edge UEs.

MODE FOR INVENTION

Figure 1:
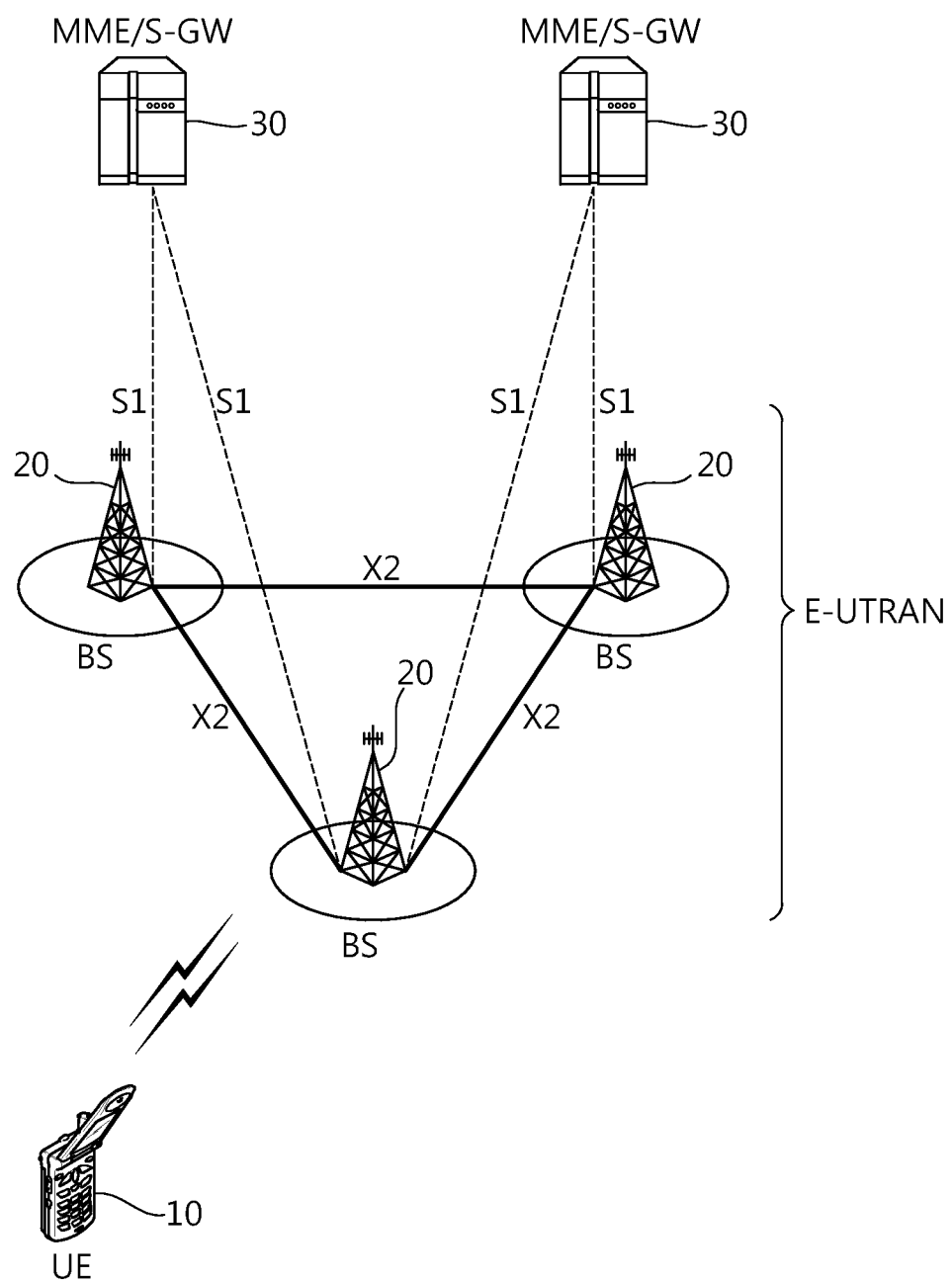
FIG. 1 is view illustrating a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
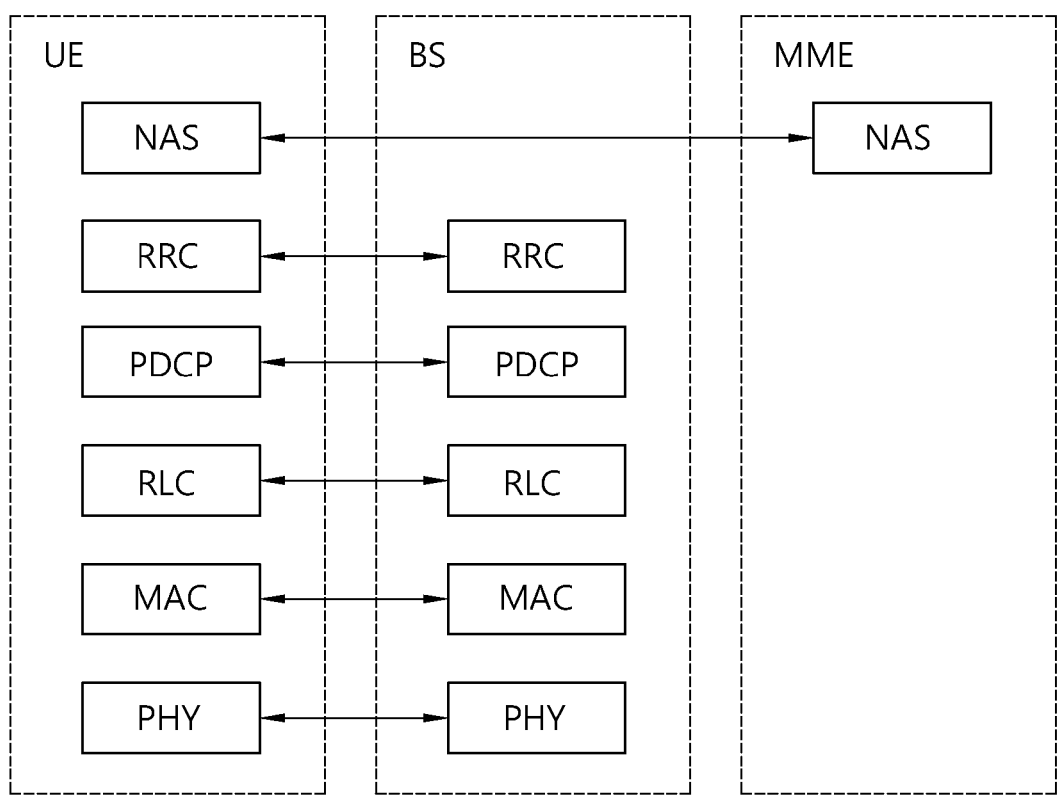
FIG. 2 is a view illustrating an example of a protocol structure to which the present invention is applied.

FIG. 2 is a diagram showing a radio protocol architecture for a user plane (U-plane) and a control plane (C-plane). The user plane is a protocol stack for user data transmission. The control plane is a protocol stack for control signal transmission with RRC and NAS layers.

Referring to FIG. 2, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH) or optionally added an Enhanced PDCCH (EPDDCH), i.e., an L1/L2 control channel.

Figure 3:
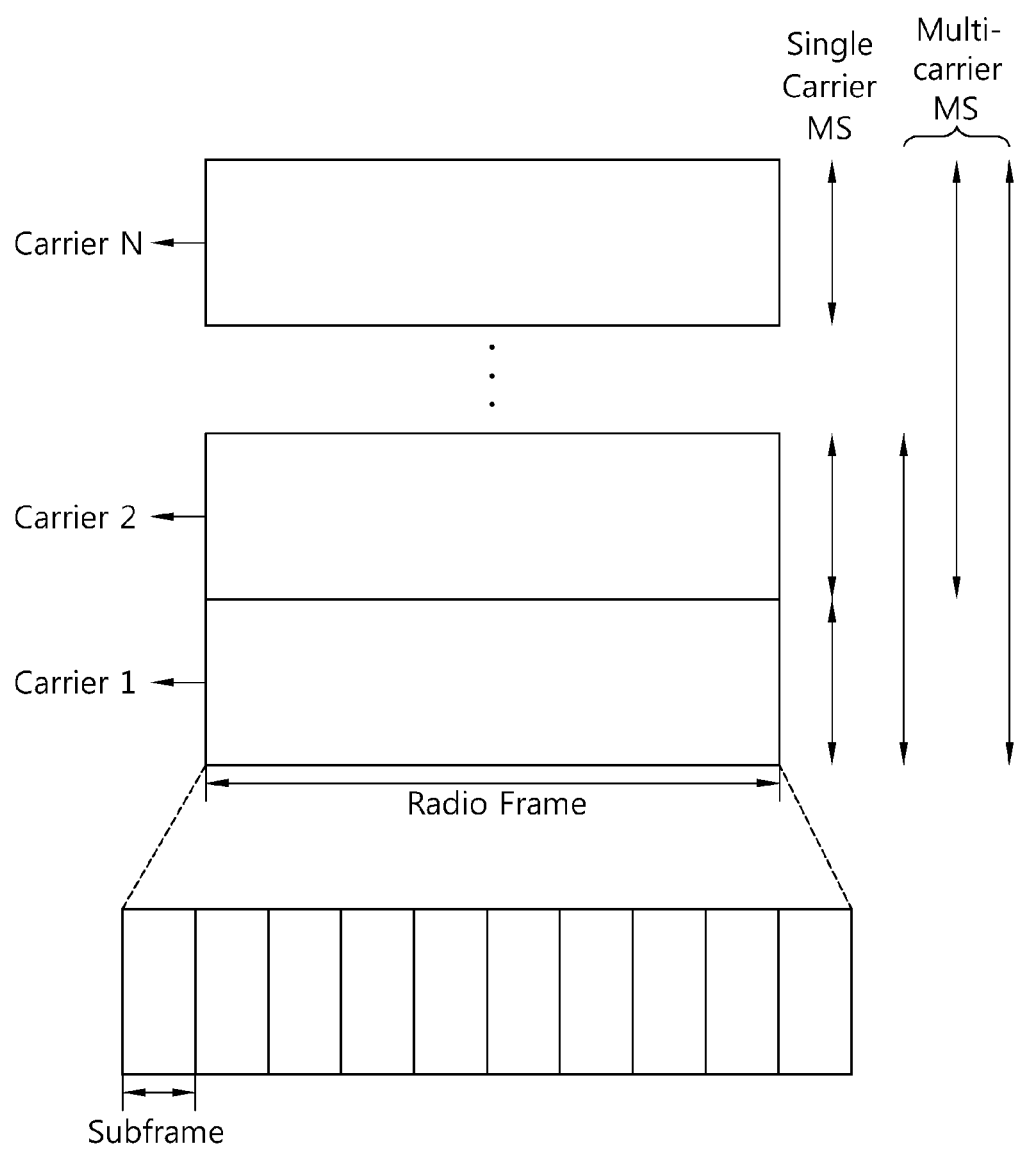
FIG. 3 is a view illustrating an example of a frame structure for a multi-carrier operation to which the present invention is applied.

FIG. 3 is a view illustrating an example of a frame structure for a multi-carrier operation to which the present invention is applied. This invention can be also applied that the aggregated CCs are not aligned at subframe as synchronization.

Referring to FIG. 3, a UE may support one or more carriers (Carrier 1 or more Carriers 2 . . . N) according to UE's capability thereof. Multiple carriers may be adjacent to each other or may not.

Component carriers may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. Furthermore, the PCC can be also activated or deactivated using an indication of activation/Deactivation as a bit. The UE can camp on the PCC as a Primary serving cell (Pcell) at first in initial access. The UE may use only one primary component carrier or one or more secondary component carriers along with a primary component carrier. The UE may be allocated a primary component carrier and/or a secondary component carrier from the BS.

A PCC is a carrier by which primary control information items are exchanged between a BS and an UE. An SCC is a carrier allocated according to a request from an UE or an instruction from a BS. A PCC may be used for an UE to enter a network and/or may be used to allocate an SCC. A PCC may be selected from among entire set carriers, rather than being fixed to a particular carrier. A carrier set as an SCC may also be changed into a PCC.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, . . . , 7 for a serving cell index 1 corresponds to a $7^{th}$ bit from the left, which are the remaining indices other than 0, i.e., the index of the Pcell. Herein, the index of the serving cell may be a logical index determined relatively for each UE, or may be a physical index for indicating a cell of a specific frequency band.

Figure 4:
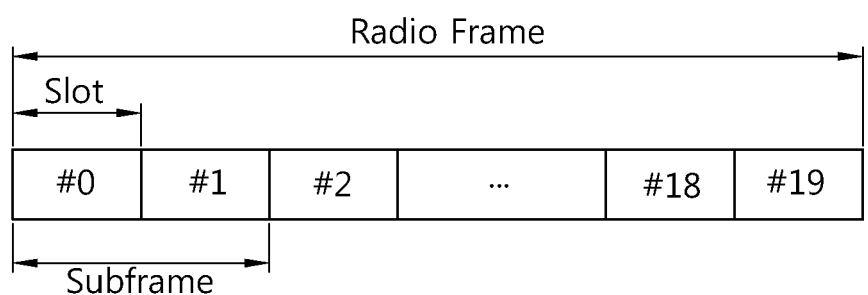
FIG. 4 shows the structure of a radio frame to which the present invention is applied.

FIG. 4 shows the structure of a radio frame to which the present invention is applied.

Referring to FIG. 4, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE and may be called an SC-FDMA symbol or a symbol period depending on a multi-access scheme. An RB is a resource allocation unit, and it includes a plurality of contiguous subcarriers in one slot.

The structure of the radio frame is only illustrative, and the number of subframes included in a radio frame or the number of slots included in a subframe and the number of OFDM symbols included in a slot may be changed in various ways.

In relation to resource allocation, a physical resource structure is first described.

Figure 5:
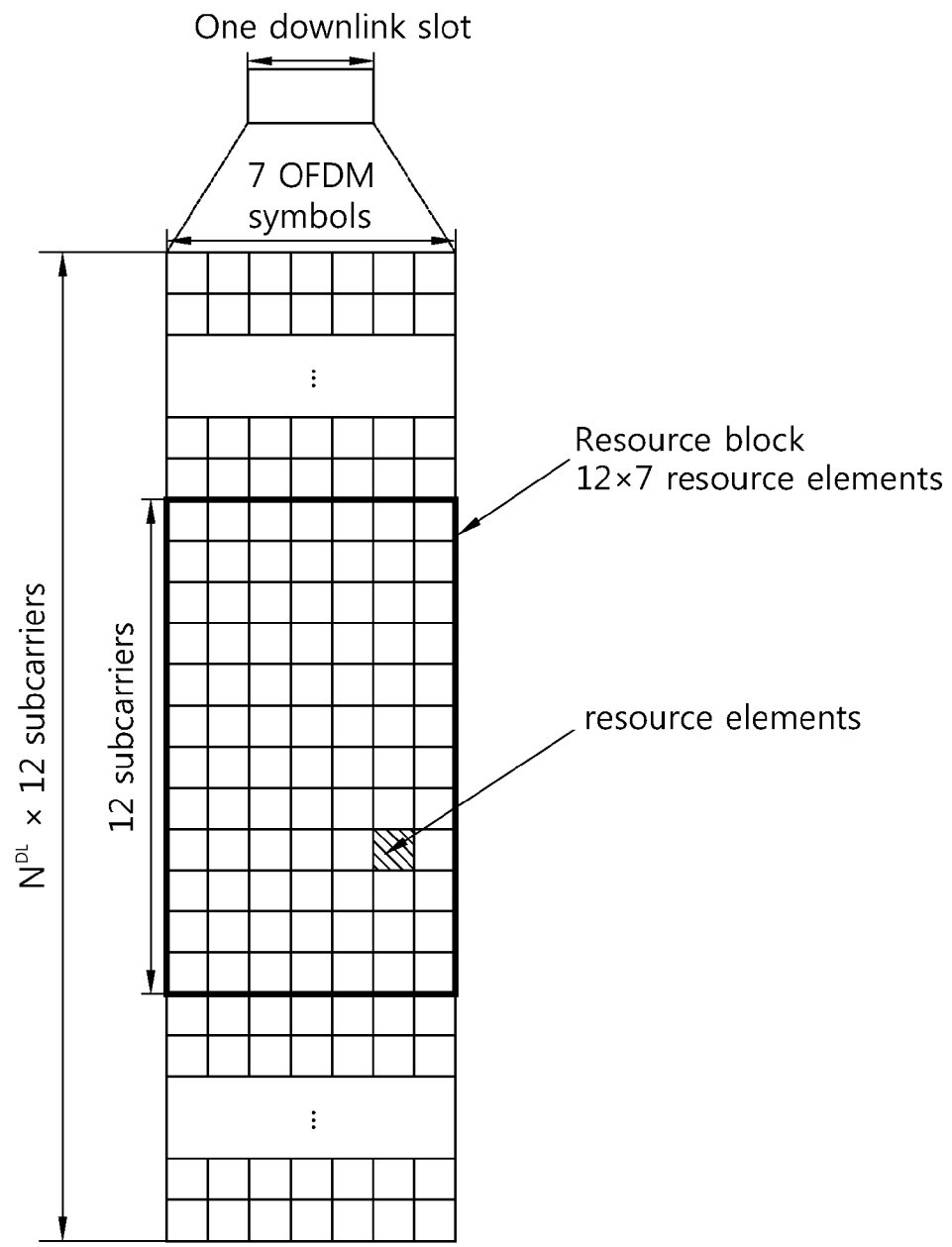
FIG. 5 is an exemplary diagram showing a resource grid for one downlink slot to which the present invention is applied.

FIG. 5 is an exemplary diagram showing a resource grid for one downlink slot to which the present invention is applied.

Referring to FIG. 5, the downlink slot includes a plurality of OFDM symbols in the time domain. Here, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7 REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
|---|---|---|---|
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

Figure 6:
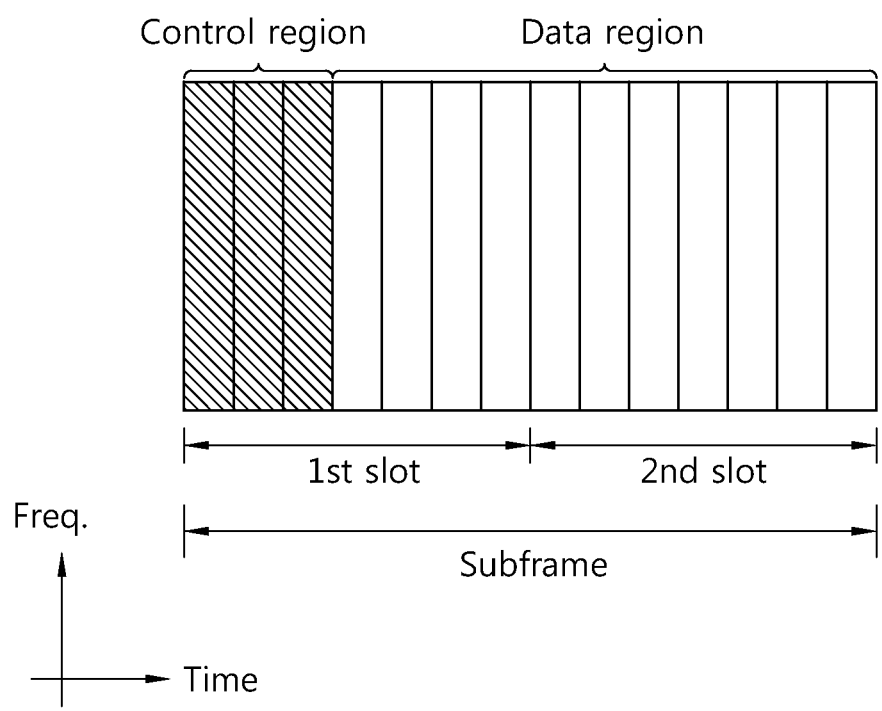
FIG. 6 shows the structure of a downlink subframe to which the present invention is applied.

FIG. 6 shows the structure of a downlink subframe to which the present invention is applied.

Referring to FIG. 6, a subframe includes two slots. The former 0 or 1 or 2 or 3 OFDM symbols of the first slot within the subframe correspond to a control region to which a PDCCH is allocated, and the remaining OFDM symbols thereof become a data region to which a PDSCH is allocated. When 0 OFDM symbols of the first slot within the subframe is used for control region, an enhanced PDCCH (EPDCCH) can be placed in data region which conveys control information.

Downlink control channels include a Physical Control Format Indicator Channel (PCFICH), a Physical Downlink Control Channel (PDCCH)/Docket EPDCCH, and a Physical Hybrid-ARQ Indicator Channel (PHICH)/EPHICH.

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH/EPDCCH.

The PHICH/EPHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH/EPDCCH, that is, a downlink physical channel, is described below.

A PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCH/EPDCCHs may be transmitted within the control region, and a UE can monitor a plurality of PDCCH/EPDCCHs. PDCCH/EPDCCHs are transmitted on one Control Channel Element (CCE)/ECCE or on an aggregation of some contiguous CCE/ECCEs. A CCE (ECCE) is a logical assignment unit for providing a coding rate according to the state of a radio channel to a PDCCH/EPDCCH. A CCE/ECCE corresponds to a plurality of resource element groups (REGs). The format of a PDCCH/EPDCCH and the number of possible bits of a PDCCH/EPDCCH are determined by a correlation between the number of CCE (ECCE)s and a coding rate provided by CCE (ECCE)s.

Control information transmitted through a PDCCH/EPDCCH is called Downlink Control Information (hereinafter referred to as DCI). The DCI includes uplink or downlink scheduling information or includes an uplink transmit (Tx) power control command for arbitrary UE groups. The DCI is differently used depending on its format, and it also has a different field that is defined within the DCI. Table 2 shows DCI according to a DCI format.

TABLE 2

| DCI format | Description |
|---|---|
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |
| 2B | Used for Resource assignments for PDSCH using up to 2 antenna ports with UE-specific reference signals |
| 2C | Used for Resource assignment for PDSCH using up to 8 antenna ports with UE-specific reference signals |
| 2D | Used for Resource assignment for PDSCH using up to 8 antenna ports with UE-specific reference signals |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 indicates uplink resource allocation information, the DCI formats 1~2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a $10^{th}$ bit to $23^{rd}$ bit of the information bit.

The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

Table 3 shows the DCI of Format 0, that is, uplink resource allocation information (or an uplink grant).

TABLE 3

Carrier indicator - 0 or 3 bits.
Flag for identifying format 0/format1A −1 bit, where 0 indicates format 0 and 1 indicates format 1A.
Frequency hopping flag −1 bit, is a Most Significant Bit (MSB) corresponding to resource allocation at need and used to assign multiple clusters.
Resource block assignment and hopping resource allocation-
$\lfloor \log_2(N_{RB}^{UL}(N_{RB}^{UL} + 1)/2) \rfloor$ bits
    PUSCH hopping (corresponding to only single cluster allocation only):
$N_{UL\_hop}$ MSB bits are used to obtain the $\tilde{n}_{PRB}(i)$ value.
$(\lfloor \log_2(N_{RB}^{UL}(N_{RB}^{UL} + 1)/2) \rfloor - N_{UL\_hop})$ bits provide the resource allocation of the first slot of an uplink subframe
    In single cluster assignment, non-hopping PUSCH
$(\lfloor \log_2(N_{RB}^{UL}(N_{RB}^{UL} + 1)/2) \rfloor)$ bits provide the resource allocation in the UL subframe.
In multi-cluster assignment, non-hopping PUSCH: Resource assignment is obtained from a combination of a frequency hopping flag field and a resource block assignment and hopping resource allocation field.

$\left\lceil \log_2\left(\left(\frac{\lceil N_{RB}^{UL}/p + 1 \rceil}{4}\right)\right) \right\rceil$ bits provide the resource allocation in an uplink subframe. wherein, P depends on the number of DL resource blocks.
Modulation and coding scheme and redundancy version - 5 bits
New data indicator - 1 bit
TPC command for scheduled PUSCH - 2 bits
Cyclic shift for DM RS and OCC index - 3 bits
UL index - 2 bits, only exist for a TDD operation, that is, an uplink-downlink configuration 0.
Downlink Assignment Index (DAI) - 2 bits only exist for TDD operations, that is, uplink-downlink configurations 1-6.
CQI request - 1 or 2 bits. a 2 bit field applies to a UE configured using at least one DL cell.
SRS request - 0 or 1 bit.
Multi-cluster flag - 1 bit.

The flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

For example, in Table 3, if the resource allocation field has 13 bits in a band of an FDD 20 MHz, an uplink grant has a total of 27 bits (except a CIF field and a CRC field). If the length of bits determined as the input of blind decoding is 28 bits, a BS makes the uplink grant the total number of 28 bits by adding the redundant bits of 1 bit to the uplink grant at the time of scheduling. Here, all the redundant bits may be set to 0 because they do not include special information. Of course, the number of redundant bits may be smaller than or greater than 2.

The wireless communication system as 3GPP LTE of the present invention uses blind decoding for PDCCH/EPDCCH detection. The blind decoding is a scheme in which a desired identifier is de-masked from a CRC of a PDCCH/EPDCCH (referred to as a candidate PDCCH/EPDCCH) to determine whether the PDCCH/EPDCCH is its own channel by performing CRC error checking.

An eNB determines a PDCCH/EPDCCH format according to DCI to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH/EPDCCH.

Figure 7:
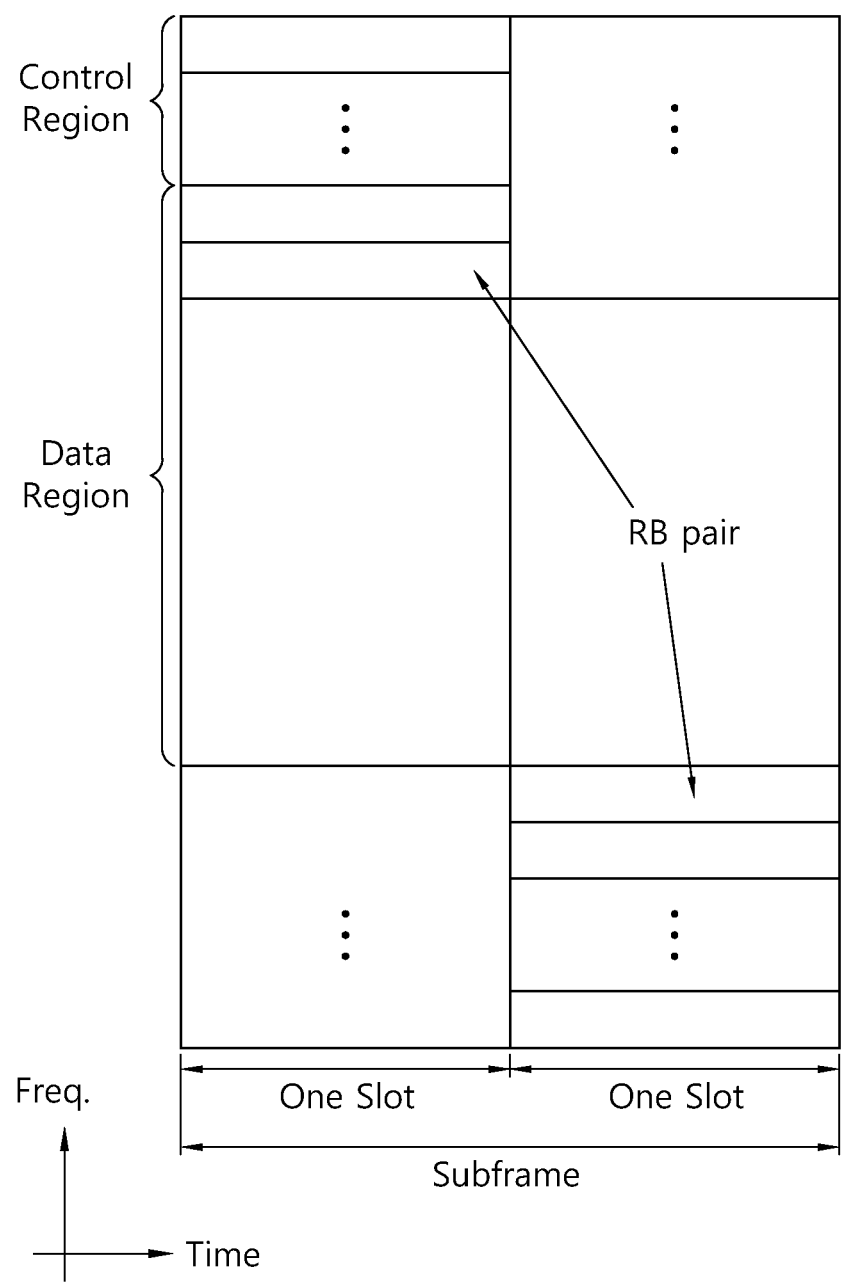
FIG. 7 shows the structure of an uplink subframe carrying an ACK/NACK signal to which the present invention is applied.

FIG. 7 is a view illustrating an example of a structure of an uplink subframe carrying an ACK/NACK signal to which the present invention is applied.

Referring to FIG. 7, an uplink subframe may be divided into a control region to which a physical uplink control channel (PUCCH) that carries uplink control information is allocated, herein; the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair are resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Meanwhile, increasing the number of network nodes, and thereby bringing them physically closer to the user terminals is a key to improving traffic capacity and extending the achievable user-data rates of a wireless communication system.

Figure 8:
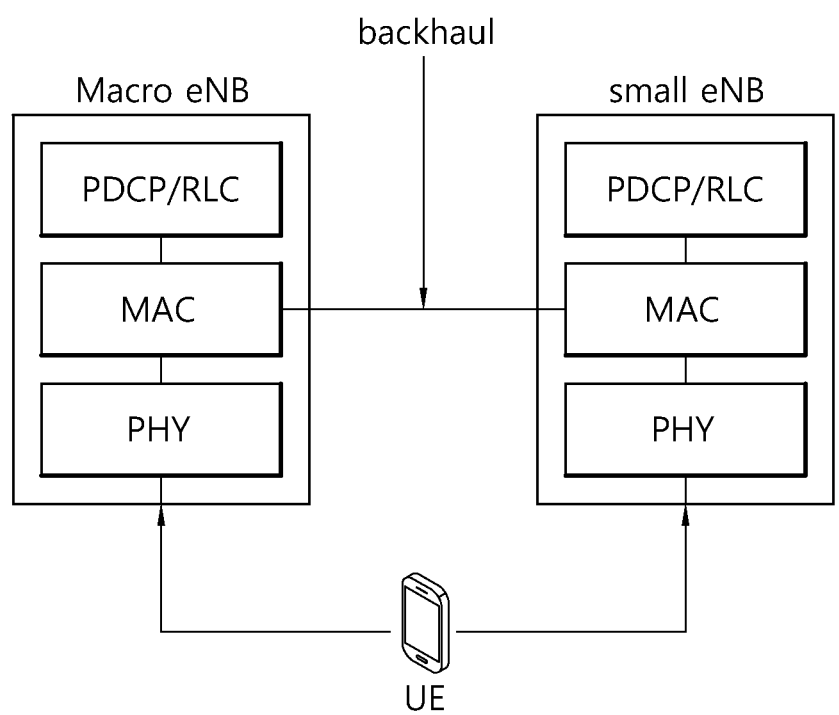
FIG. 8 shows an exemplary concept for dual connectivity according to an exemplary embodiment of the present invention.

FIG. 8 shows an exemplary concept for supporting a control plane (C-plane) and user plane (U-plane) according to an exemplary embodiment of the present invention.

Referring to FIG. 8, the development of wireless communication technology, a heterogeneous network environment comes to the front. A macro cell, a femto cell, a pico cell, etc. are used in this heterogeneous network environment. As compared with a macro cell, a femto cell or a pico cell is a system that covers an area smaller than the existing mobile communication service radius. In addition to straightforward densification of a macro deployment, network densification can be achieved by the deployment of complementary low-power nodes under the coverage of an existing macro-node layer.

In such a heterogeneous deployment, the low-power nodes provide very high traffic capacity and very high user throughput locally, for example in indoor and outdoor hotspot positions. Meanwhile, the macro layer ensures service availability and QoE over the entire coverage area. In other words, the layer containing the low power nodes can also be referred to as providing local-area access, in contrast to the wide-area-covering macro layer. The installation of low-power nodes as well as heterogeneous deployments has been possible.

An extending the capabilities to operate in heterogeneous deployments are added to the LTE system, the macro and low-power layers, including different forms of macro assistance to the low-power layer and dual-layer connectivity. A dual connectivity implies that the device has simultaneous connections to both macro and low-power layers. Dual connectivity may imply Control and Data separation where, for instance, the control signaling for mobility is provided via the macro layer at the same time as high-speed data connectivity is provided via the low power layer as the small cell. A separation between downlink and uplink, where downlink and uplink connectivity is provided via different layers. Furthermore, the Dual connectivity may be applied to between different eNBs, where each eNB of the different eNBs provides via same layers (or as same type) on different site, herein, the different eNBs can be a case of small cells or a case of macro cells.

An UE of the present invention can support service via the macro cell having a frequency band of f1 to transmit and receive data transmission in Uplink/Downlink, and also the UE can support service via the small cell having a frequency band of f2 to transmit and receive data transmission in Uplink/Downlink, the f1 and f2 can be same or different or partially overlapped. That is, the UE can use the macro cell and the small cell simultaneously to supporting Dual connectivity, it is included that a radio link between the UE and the macro cell (macro eNB) and a radio link between the UE and the small cell (small eNB) is established respectively.

Therefore, the control for the radio link each can be needed. Herein the macro cell and the small cell, for instance, a radio interface protocol between the UE and each cell eNB can be classified into a first layer (L1), a second layer (L2), and a third layer (L3) based on three layers of the OSI in the communication system. For example, the macro eNB includes PDCP, RLC, MAC and PHY layer and the small eNB may include RLC, MAC and PHY layer, optionally PDCP layer is included. Herein the PDCP layer of the macro cell can be connected RLC layer of the small cell via the Xa (interface protocol), the Xa interface can be a X2 interface in LTE system. An EPS bearer each is established to provide service by establishing RB with the macro eNB and the small eNB each to UE.

Furthermore, this invention provides that a C-Plane and a U-Plane split over different carriers are existed. More particularly, the U-Plane discovery enhancement, system information delivery in U-Plane, co-channel scenario, and large system bandwidth handlings in this invention are shown. Because of its benefits, there is great interest on C-Plane and U-Plane split over different carriers which may be intra-eNB or inter-eNB. The most promising scenario would be that C-Plane is over macro-cell layer, and U-Plane is over small-cell layer so that it may keep the benefit of macro coverage in terms of hand-over & coverage, boost data throughput by localizing data transmission, and offload heavy load from macro-cell. Therefore, it can offer better Quality of Experience (QoE) on UEs in particular cell-edge UEs.

In this invention, deployment scenarios are described in detail below, mainly three alternatives can be considered.

(1) Scenario A: Co-channel scenario where macro and small cell share the same frequency for both downlink and uplink (2) Scenario B: Co-channel scenario where macro and small cell share at least either downlink or uplink frequency (3) Scenario C: Dedicated frequency scenario where macro and small cell are deployed in different frequencies and small cell uses dedicated frequency band a) Where UE is equipped with separate RFs and baseband processors for macro and small cell carriers b) Where UE is equipped with separate RFs and one shared baseband processor shared for macro and small cell carriers This invention focuses on Scenario A and Scenario C-b) and discusses a few issues to realize the deployment scenarios. This invention assumes that a UE is under macro-cell coverage and thus it does not address the issue where small cell is in stand-alone operation. Moreover, when macro and small cell are intra-eNB, Scenario A may be handled via Coordinated Multi-Point transmission and reception (CoMP) and Scenario C may be handled via Rel-11 Carrier Aggregation mechanism. Thus, this invention focuses on Inter-eNB case where macro and small cell are not co-site. The ideas proposed here can be also applicable to intra-eNB scenarios as well and also for Scenario B and C-a) case.

For a convenience, this invention assumes that the followings are the main functions of C-Plane and U-Plane respectively, C-Plane provides functions of RRC Connection, Re-connection, Maintain RRC Idle state UEs, Handling UE mobility including hand-over, Cell selection, reselection, RRM measurement, HARQ process for control-plane data, Carrier aggregation configuration, reconfiguration, Necessary RRC configuration, VoIP support, and Random access procedure (particularly contention-based random access).

Further, U-Plane provides functions of Data handling from application, CSI report, HARQ process for application data, Multicasting/broadcasting service, and Random access procedure (particularly non-contention-based random access). A function split between C-Plane and U-Plane shown in this invention is an example. Depending on the actual architecture of C/U plane, the function split can be different. For example, U-Plane may have RRC configuration as well and C-Plane may take over multicasting/broadcasting function.

From a UE perspective, handling C-Plane and U-Plane CCs can be configured (1)C-Plane CC as PCell and U-Plane CC as a SCell (inter-site CA) (2) treat C-Plane CC specially and assign U-Plane as PCell (single CC) (3) U-Plane CC as PCell and C-Plane as SCell (4) Treat C-Plane and U-Plane as PCell (dual-connectivity) (similar to (2) from PHY perspective).

Due to applying on LTE system, this invention considers that option (1) is the most desirable. When option (2) is used, from physical layer perspective, UE may have multiple PCells. When option (3) is used, hand-over procedure dependent on PCell may have to be changed such that hand-over occurs based on C-Plane CC regardless of PCell or SCell.

This invention assumes that macro-cell C-Plane is aggregated as PCell and small cell U-Plane is aggregated as a SCell. The proposed ideas can be applied to cases where more than 2CCs are aggregated without loss of generality. Between PCell and SCell, backhaul may be ideal (i.e., high-speed & throughput) or non-idea (i.e., high-latency and/or low throughput). This invention mainly focuses on non-idea backhaul case where the latency between PCell and SCell may exceed a few msec (e.g., 20 msec range) via X2 interface or a new backhaul interface Xa.

Figure 9:
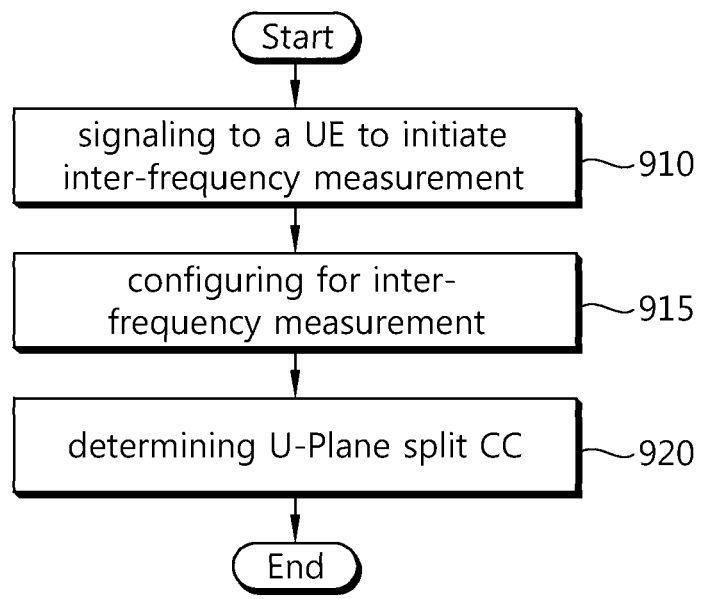
FIG. 9 shows an exemplary flow chart for small cell discovery according to an exemplary embodiment of the present invention.

Meanwhile, small cell discovery is described below in FIG. 9 which shows an exemplary flow chart for determining small cell discovery according to an exemplary embodiment of the present invention.

As small cell discovery is for U-Plane separation, it is desirable to limit the small cell discovery to cases where UE needs U-Plane split or data offloading such as a UE with heavy load and/or low mobility (or indoor), or heavy load condition occurs in macro-cell, etc. Thus, this invention proposes a higher-layer signaling to a UE to initiate inter-frequency measurement when the UE needs a separate U-Plane split in addition to C-Plane (as to boost throughput or improve the coverage).

This higher layer signaling can also include the frequency or the list of frequencies where candidate U-Plane CCs can be searched as well as the cell IDs of potential U-Plane CCs. Or, this higher layer signaling can behave as if trigger to initiate inter-frequency measurement gap which is either configured prior or at the same time. This higher layer signaling can include information for indicating whether the inter-frequency measurement gap is enable or disable, herein the information sets to enable that the inter-frequency measurement gap is performed or also the information sets to disable that the measurement gap is not performed. When enabled, a UE shall perform inter-frequency measurement.

Inter-frequency measurement gap can be configured or if CA capability is supported parallel inter-frequency measurement is feasible. The idea proposed in this invention is to trigger inter-frequency measurement aperiodically. Multiple approaches are feasible as follows:

(1) eNB configures a measurement object for inter-frequency measurement and triggered by DCI: similar to aperiodic CSI request, additional bits can be added to DCI to trigger one or a subset of inter-frequency measurements. Or, a state of aperiodic CSI request or existing DCI field may be reused for triggering inter-frequency measurement. When a UE is triggered to perform inter-frequency measurement, it will switch to the requested frequency at n+4th subframe (or n+kth subframe where k>0) and perform inter-frequency measurement for a duration C (C>=5 msec) (910).

(2) Based on inter-frequency measurement gap, a UE enters into inter-frequency measurement gap only when it is triggered to perform inter-frequency measurement. The triggering can be given by higher layer signaling or DCI (915).

A UE is higher-layer requested for small cell discovery where the request may carry center frequency, measurement period, desired SINR(Signal to Interference plus Noise Ratio) threshold, the number of required reports, desired load, desired QoS level, etc. Furthermore, eNB may set threshold or selection criteria in terms of radio resource management (RRM) report where RRM reports will be pre-selected based on threshold or selection criteria given by higher-layer. Herein, In this case, the level of interference on the part of the cell terminal sacrifices greatly, depending on the sub-frame changes, which RSRP (Reference Signal Received Power)/RSRQ (Reference Signal Received Quality). In this situation, each sub-frame in a more accurate wireless radio link monitoring, link monitoring (RLM) or to measure radio resource as RRM measurement.

As the main purpose of having a separate U-Plane is to boost data throughput, it is desirable to broadcast load information and/or other quality related information (such as wide-band, power, etc) in discovery channel of small cell which can be used for U-Plane cell selection mechanism. The broadcasted information (either explicitly or implicitly) can be used by a UE to prune the choices of U-Plane small cells before reporting RRM results to C-Plane eNB. For example, UE may report RRM results on small cells with low or medium load (920). Or, the load information identified by the UE can be reported to the serving cell so that the serving cell can consider the information for the cell selection.

Another approach is that discovery channel such as synchronization channel (e.g., PSS (Primary Synchronization Signal)/SSS(Secondary Synchronization Signal) and/or a new discovery channel (e.g., PRS (positioning reference signal) based discovery channel) may not be transmitted by small cell with heavy load so that UE may not discover the heavy-loaded small cell from the beginning. Or the frequency of synchronization signals can be adapted based on the load of the small cell so that by detecting the frequency of small cell synchronization signal, UE may infer the load level of the small cell. Another approach considered is to design a new admission signal in addition to PSS/SSS for cell discovery where the admission signal will not be transmitted by the small cell eNB if there is no more UEs is allowed to the cell. The admission signal frequency may be adapted based on the load on the small cell such that high frequency implies low load on the cell (and thus allow more UEs connected) and vice versa. This information may be carried in MIB so that early barring based on quality on the small cell is feasible. Or, small cell may not transmit MIB if load becomes heavy so that UE may not be able to discover the cell. Herein this technique can be applicable to all scenarios for C/U split cases as well as stand-alone small cell scenarios.

System Information of U-Plane CC is described in detail below. To support system information of U-Plane CC, the following approaches would be feasible.

(1) Stand-alone like System information in U-Plane CC: UE reads system information of small cell via small cell SIB broadcast: in this case, desirably, synchronization signal carries some information so that UE is able to prune undesirable small cells before full RRM measurement/report. For instance, load level or system bandwidth may be encrypted in PSS/SSS and/or discovery channel. By reading the synchronization signals, UE may be able to perform initial pruning on cell selection.

(2) Rel-10 Carrier Aggregation+RRC signaling from C-Plane CC: UE reads system information of small cell via C-Plane CC (by RRC signaling or other means): as there are many neighbor small cells which may offer different characteristics, it would be desirable to send at least a part of system information of U-Plane CC at measurement request. For example, the system bandwidth, duplex scheme, etc may be transmitted to the UE at inter-frequency measurement request so that UE may take the information into account in the selection of small cells before RRM report.

(3) UE-category based SIB on small cell: based on C-RNTI or a new ID (for U-Plane selection) assigned by C-Plane, the resource (or PRB index) where system information of small cell carried may be changed where C-RNTI assigned by C-Plane may be based on the required system bandwidth and/or required data rate and/or required latency and etc. The C-RNTI, Temporary Cell Radio Network Temporary Identifier (temp C-RNTI), and Semi-Persistent Scheduling (SPS) C-RNTI for Dedicated Control Channel (DCCH) and DTCH are used to identify information dedicated to a particular subscriber on the radio interface.

For example, if small cells can be categorized into three groups: highly available throughput, medium available throughput and low available throughput. In terms of placing system information (such as MIB), medium available throughput cell may place MIB in the center and highly available throughput cell may place MIB in 6PRB above the center, and low available throughput cell may place MIB in 6PRB below the center (or different regions depending on configuration). Depending on the UE requirement, C-RNTI or a new ID is assigned to the UE where each category UE is first finding small cells which fulfill the requirement. Say, a UE requires high throughput due to heavy traffic, it would like to find small cells with highly available throughput category whose MIB can be read from 6PRB above the center frequency. Other information can be used to determine the location of system information. To enhance ICIC among small cells/macro-cell, the location where MIB (or PBCH) is placed based on UE ID may hop per subframe following a pre-determined hopping pattern. Assuming SFN among small cells and macro-cell are aligned, UE is able to infer the PRB based on the pre-determined hopping pattern. In addition to PBCH, a default CSS may be placed at the same PRB or follow a similar rule to PBCH to be placed which is UE-specific. DM-RS used for default CSS may be used for time and frequency tracking in addition to TRS (tracking RS) and/or CSI-RS.

(4) UE-specific SIB: furthermore, system information of SCell may be carried to each UE separately on small cell at measurement phase or after SCell attachment is completed. The information may be sent via USS.

(5) Use DM-RS for ePDCCH as for tracking purpose: assuming that regardless of actual ePDCCH present or not PRB configured for ePDCCH region will transmit DM-RS (with configuration for ePDCCH), DM-RS for ePDCCH region may be used for time/frequency tracking of the serving cell. If a UE is informed with neighbor cell's ePDCCH configuration, DM-RS of neighbor cell may be used for RRM measurement of neighbor cell as well.

Here, the UE may assume that system information between PCell and SCell are the same unless it is higher-layer configured to otherwise.

In terms of transmitting system information, this invention proposes the following: A pre-determined set of PRBs are reserved for transmitting CSS ePDCCH (e.g., a center 6RB or dedicated region signaled by macro-cell). Note that the CSS region can be changed per subframe based on frequency hopping pattern (which is pre-determined, or signaled by PBCH/MIB or linked to cell ID (or virtual cell ID)). PBCH/MIB can utilize frequency hopping as well per subframe (where the hopping pattern may be pre-determined or linked to (virtual) cell ID). This applies to generic stand-alone carrier as well. Furthermore, all the techniques can be applicable to legacy and stand-alone new carrier as well.

Otherwise, System information including master information block are scheduled as CSS (common search space) PDSCH or USS (UE-specific Search Space) PDSCH or GSS (Group-specific Search Space) PDSCH.

By this way, system design of small cell becomes flexible to decide whether to transmit MIB and SIB. Small cell dependent on deployment scenario may decide what broadcast information will be transmitted or not solely based on PDSCH transmission rather than pre-fixed broadcast channel such as PBCH. When small cell does not transmit broadcasted MIB and/or SIB or is configured not to transmit broadcast system information (solely dependent on unicast system information), it may be informed to the UE as the subframe/resource reserved for system information can be used for something else.

Another case or benefit by transmitting UE-specific system information is to enable UE-specific system configuration where system may utilize its resource flexibly dependent on UE capability. For example, system bandwidth is 100 Mhz and UE capability supports only 20 Mhz, eNB may create a virtual carrier with system bandwidth=20 Mhz to support the UE and inform the UE that system bandwidth of the carrier is 20 Mhz rather than 100 Mhz. At the same time, if another UE supports 100 Mhz, small cell indicates system bandwidth of 100 Mhz to the UE to fully maximize the bandwidth.

CSS on SCell is described below. For CSS example is paging. To support device-to-device communication, broadcast, multicast, EAB, etc, it may be necessary to support paging in U-Plane CC as well.

Because of its potential benefits and needs, this invention proposes to enable UE to monitor CSS on SCell as well. Considering scenario A and C-b), mechanisms to allow multiplexing of CSS on both carriers in TDM fashion may be necessary. To address this, CSS subframe of PCell and SCell can be coordinated so that at one subframe, UE shall monitor either PCell CSS or SCell CSS but not both. To implement this, (1) each PCell and SCell sends its intended CSS subframe to the UE and UE selects either one when a conflict occurs. UE may select to give higher priority to SCell or PCell (2) PCell and SCell may coordinate the CSS subframe via backhaul interface to avoid the conflict (3) UE may monitor PCell CSS always except for subframes indicated by PCell to monitor SCell CSS (or vice versa).

Furthermore, monitoring on CSS on SCell can be enabled or disabled via higher-layer configuration. Once CSS monitoring on SCell is enabled, UE shall monitor CSS on SCell either in addition to CSS on PCell or exclusively on SCell.

In terms of dividing subframes for CSS/USS monitoring on either PCell or SCell, UE may be configured with C-Plane Gap which will be configured either by PCell or SCell where UE performs necessary C-Plane functions such as mobility handling, RRM measurement, etc. For example, C-Plane gap may be defined as k (e.g., 6) msec every C-Plane management period (e.g., 160 msec) where U-Plane data transmission/reception will be temporarily stopped and UE will perform necessary mobility handling procedure (similar to inter-frequency measurement gap). When C-Plane Gap is configured, UE shall monitor both CSS/USS on PCell in C-Plane Gap and shall monitor both CSS/USS on SCell otherwise. Using this approach, RRC connection on U-Plane may be established via hand-over from C-Plane CC. A virtual RRC connection to C-Plane will be kept as well for mobility handling.

This TDM multiplexing applies also to USS as well considering scenario A and C-b). For further enhancements in terms of UE DTX/DRX, it is also considerable to assign UE-specific downlink subframes for each UE where UE shall monitor CSS and/or USS and in other downlink subframes, UE may not monitor USS and CSS. The similar approach is applicable to uplink subframes as well such that a UE is configured with a subset of uplink subframes where a UE is configured to transmit to C-Plane CC and a subset of uplink subframes where a UE is configured to transmit to U-Plane CC. Two subset of uplink subframes may not be overlapped considering scenario A and C-b). If UE is capable of handling simultaneous transmissions, two subsets may be overlapped.

The benefit of defining uplink subframes are to allow flexible A/N timing depending on UE capability in terms of transmission, allow flexible inter-cell coordination from the transmission and interference aspect, and allow flexible UE DTX for uplink transmission.

RRC signaling on SCell is shown below, as C-plane is done via PCell, RRC signaling on SCell can be done (1) via PCell RRC signaling where any higher-layer signaling can be sent over PCell from SCell via backhaul interface and higher-layer signaling is done via PCell. (2) higher layer configuration via MAC CE on SCell (3) separate RRC connection to SCell so that higher-layer signaling can be done via SCell RRC signaling.

Radio Link Failure is defined as, both options (Rel-10 behavior—only RLF on PCell or separate RLF on PCell/SCell) can be considered. When RLF measurement on PCell only is used, this invention proposes to allow additional CSI configuration for SCell CSI reporting which will be transmitted to PCell (C-Plane CC). The configuration is done by either PCell or SCell. When CQI report on SCell is below a certain threshold or CQI has not been received, PCell may request inter-frequency measurement to locate better SCell candidate and reconfiguration on SCell may be initiated by PCell.

Another option to determine the quality of U-Plane SCell connection is via periodic status report by U-Plane CC to C-Plane CC on the specific UE based on SRS or CSI report. U-Plane CC periodically reports the quality of SRS or CSI report received by U-Plane uplink to determine the quality of U-Plane connection.

When U-Plane CC is deactivated (or reconfigured or released) and no more U-Plane CC (attached as a SCell) exists, U-Plane functions are fall-backed back to C-Plane CC (PCell).

A/N Transmission is explained. When UE is configured with U-plane SCell, UE assumes that data transmission and A/N will be done via SCell unless it is configured otherwise. If there are more than one SCell (U-Plane CCs), the smallest CC index SCell will be used for A/N purpose.

Figure 10:
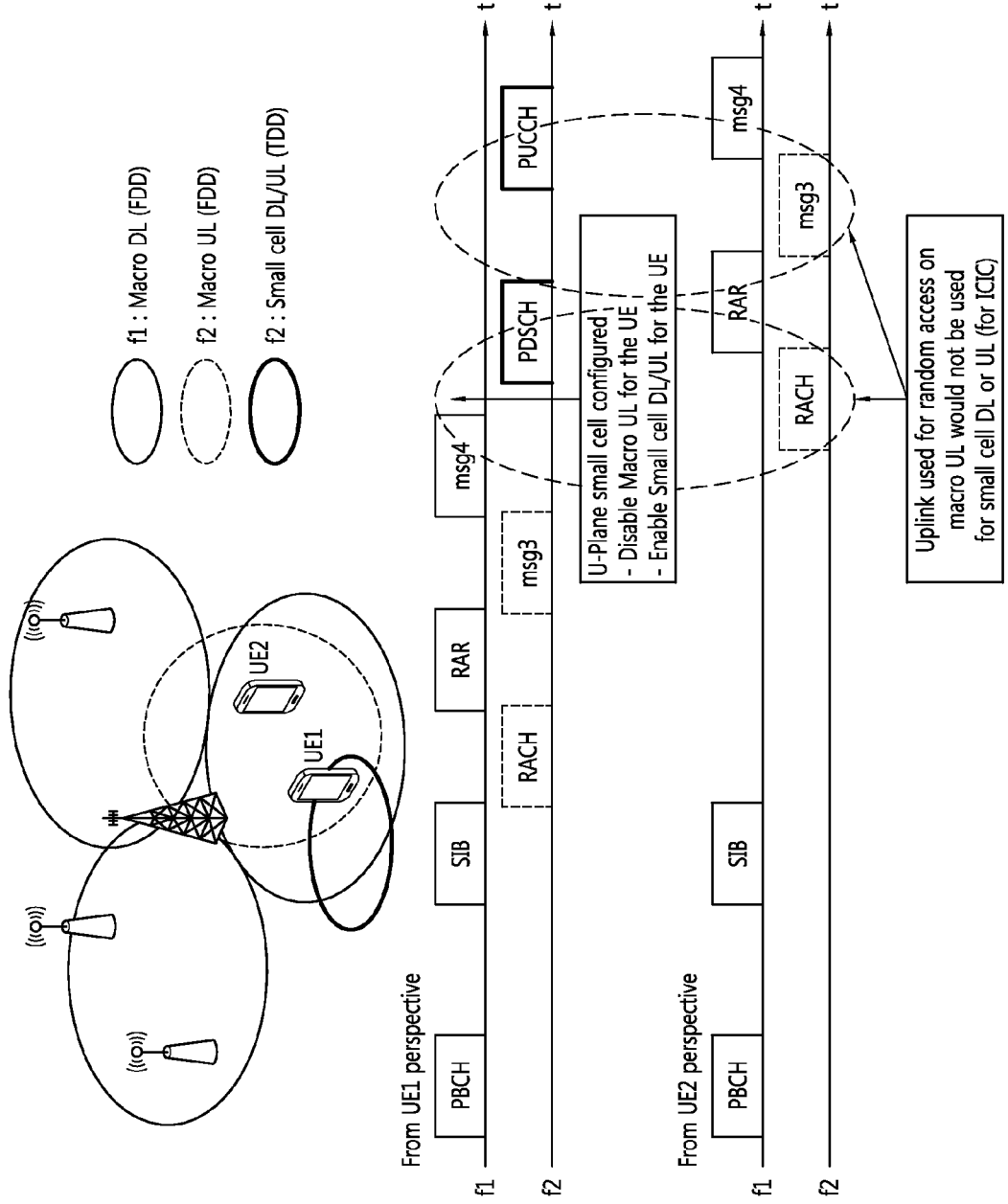
FIG. 10 shows an exemplary concept for reusing macro uplink frequency for small cell downlink according to an exemplary embodiment of the present invention.

FIG. 10 shows an exemplary concept for reusing macro uplink frequency for small cell downlink according to an exemplary embodiment of the present invention. Especially, a FDD/TDD aggregation scenario on co-channel case is explained.

Referring to FIG. 10, co-channel scenario for C/U plane split is to reuse macro uplink frequency for small cell downlink and uplink as shown in the above figure. Assuming a macro runs FDD with f1 (for DL) and f2 (for UL), a UE is connected to the macro cell via f1/f2 FDD operation. Once it is attached to the macro cell and macro cell wants to assign a separate U-Plane via small cell which runs TDD on f2, the following behavior at the UE is expected.

(1) Once small cell (U-Plane) is configured, macro-cell (PCell) disable PCell uplink for the UE via higher-layer signaling (or UE may assume that when f2 TDD is aggregated, f2 UL on FDD is disabled automatically). When PCell uplink is disabled, UE shall transmit any uplink transmissions via SCell uplink resource.

(2) Any uplink transmission such as PUCCH and/or PUSCH scheduled on PCell uplink will be transmitted via SCell uplink where the uplink resource would be determined such that the first available uplink will be used or a separate timing may be defined.

(3) To allow other UEs on macro-cell, small cell TDD operations shall not transmit any data on a subset of subframes configured by the macro cell (where the subset of subframe could be UE-specific based on potential interference situation). For example, at least one subframe in every radio frame may be reserved for macro or PCell uplink transmission to deliver HARQ-ACK or CSI feedback which should not be used for either downlink or uplink transmission by SCell. The at least one subframe is configured for the UE to perform radio resource monitoring on PCell.

To determine those subframes, macro-cell either explicitly sends a subset of subframes which cannot be used by the small cell to the small cell and/or the UE or small cell and/or UE assumes that configured RACH subframes of macro uplink should be reserved for macro uplink resource (including subframes to transmit msg3 as well) or a pre-determined subframe (such as #1 and #6 in every radio frame) can be assumed.

In other words, when a subframe of the PCell UL in FDD shares SCell UL/DL in TDD on the same frequency, the UE determines whether the subframe is included in a restricted measurement set. The restricted measurement set is received on the measurement object for the inter-frequency measurement configured by eNB. Herein the measurement object includes a threshold or selection criteria for a radio resource management (RRM) report.

Therefore, the UE checks that the at least one subframe or a subset of subframes configured by the macro cell is the restricted measurement set, and the UE determines to not use for the downlink or uplink transmission of the small cell when the subframe or the subset of subframes configured by the macro cell is in the restricted measurement set. And then, the UE performs to monitor radio resource on a PCell at the at least one subframe. This includes that the UE checks and calculates a subframe for the restricted measurement set without additionally a signal to use or not use the subset of subframes.

(4) Restricted subframe set may be indicated to the UE so that UE shall not transmit or expect downlink data on those. This set can be RRM restrict measurement set. When a UE is configured with restricted RRM measurement for SCell, a UE may assume that downlink and/or uplink transmissions for SCell would be feasible for the configured subframes only. More particularly, the restricted measurement set 0 used for the determining available DL and/or UL subframes for the SCell whereas the restricted measurement set 1 used for determining not-available (or non-usable) DL and/or UL subframes for the SCell. Alternatively, if the restricted measurement sets are configured only for PCell, the restricted measurement set 1 can be used to determine available DL and/or UL subframes for the SCell when PCell UL CC and SCell share the same frequency.

(5) To allow SRS transmission on macro uplink, restricted subframes for small cell TDD subframe may be used for macro uplink SRS transmission for the UE. To enable this option, UE shall assume that even though PCell uplink is disabled, once aperiodic SRS request has received, it shall transmit the SRS on PCell uplink resource. Furthermore, UE may be configured, instead of disabling macro uplink totally, to transmit on macro uplink on a subset of subframes which will not be overlapped with small cell downlink/uplink subframes.

(6) CSI on PCell will be transmitted via SCell uplink resource, which may require reconfiguration of CSI on PCell or can be transmitted via SPS PUSCH for CSI.

HARQ Timing can show in this invention, the simplest approach to determine A/N timing for PDSCH is as follows. A/N for PDSCH received at n-th subframe is transmitted at the first available uplink subframe n+k-th subframe where k>=4. It may not evenly distribute the number of A/N bits that each uplink may have to transmit, yet, it may be the simplest approach to determine NN timing for various subset of usable uplink subframes. When it calculate the number of A/N bits, it may utilize DAI. The actual valid downlink subframes (i.e., excluding non-available TDD downlink subframes) will be used for calculating the number of A/N bits. Another approach is to send A/N only when A/N request is received or, send A/N based on A/N SPS configuration.

Meanwhile, PUSCH/PDSCH SPS Handling can be included in this invention. When the subframe configured for SPS PDSCH or PUSCH is not available due to the restricted subset, UE shall ignore/skip the SPS once.

Larger than 20 Mhz available bandwidth (U-Plane) handling is provided. There is a possibility to utilize high frequency band such as 3.5 Ghz for LTE band for U-Plane CC. It is likely that a chunk of bandwidth larger than 20 Mhz (which is the maximum system and width in LTE) may be available in that frequency band. To effectively handle this situation, this invention proposes the following:

Increase the maximum system bandwidth with keeping the maximum system bandwidth handling capability at UE to 20 Mhz: using this approach, each UE will transmit and receive in FDM fashion within the system bandwidth where maximum number of PRB allocated to each UE would not exceed 110 (20 Mhz). The benefit of this approach compared to a separate 20 Mhz carrier is to allow a UE to switch carrier without intra-frequency handover procedure, and also allow flexible load balancing and ICIC mechanism.

Initial Access is shown in this invention as following; assuming a carrier with larger than 20 Mhz system bandwidth, e.g., 100 Mhz, eNB partition one carrier into multiple sub-carriers where each sub-carrier 里 bandwidth does not exceed 20 Mhz. Information of each sub-carrier is transmitted via MIB. One synchronization signal such as PSS or SSS or discovery channel is transmitted for the whole carrier (e.g., at center 6RB). A common MIB is carried over center frequency (or other dedicated frequency) as well. Depending on the system bandwidth, the location of default CSS region or PBCH can be changed such that by reading the location of default CSS or PBCH, a UE can infer the system bandwidth of the small cell.

Configuration of DL and UL is shown in this invention. As the capability of UE may be different in terms of maximum bandwidth that UE can handle (e.g., a UE supporting 2CC can handle 40 Mhz system bandwidth in general), depending on the capability, UE can be configured with different numbers of downlink and uplink sub-bands (e.g., 2CC capable UE with 2 DL/UL sub-bands). To configure sub-band of DL/UL, first C-Plane may assign the DL/UL of U-Plane CC via RRC configuration. Another approach the invention proposes is to utilize random access response where small cell indicates the assigned DL/UL in the random access response message.

If a UE is configured with more than one sub-bands, it can be considered as more than one SCell which are belonging to the same TAG.

The proposed ideas can be also applicable to cases where system bandwidth is equal to or less than 20 Mhz and eNB wants to partition the whole band into a few sub-bands.

Figure 11:
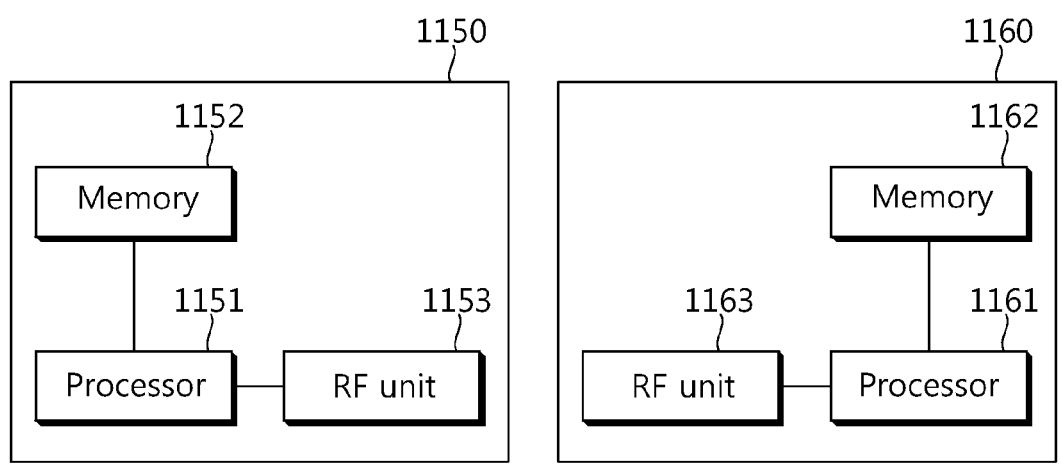
FIG. 11 shows a block diagram showing a wireless communication system according to an exemplary embodiment of the present invention.

FIG. 11 is a block diagram showing a wireless communication system according to an embodiment of the present invention.

A BS 1150 includes a processor 1151, a memory 1152, and a radio frequency (RF) unit 1153. The memory 1152 is coupled to the processor 1151, and stores a variety of information for driving the processor 1151. The RF unit 1153 is coupled to the processor 1151, and transmits and/or receives a radio signal. The processor 1151 implements the proposed functions, procedures, and/or methods. In the embodiments of FIG. 2 to FIG. 10, the operation of the BS can be implemented by the processor 1151.

Especially, the processor 1151 may configure a measurement object for inter-frequency measurement and trigger by DCI. The trigger may include aperiodic CSI request or higher layer signaling. The processor 1151 may configure to UE small cell discovery parameters such as a center frequency, a measurement period, and a threshold or selection criteria of RRM measurement, etc. The processor 1151 may configure to send the discovery channel using the PSS/SSS and/or a new discovery channel via a small cell or a macro cell selectively by confirming the heavy load of the small cell.

Also the processor 1151 may configure SI of U-Plane CC via the small cell or SI of C-Plane CC via the macro cell by controlling selectively, herein the SI on small cell is consist of the C-RNTI assigned by C-Plane or new ID. This invention is not excluded that the SI between PCell and SCell are the same or different. This invention assumes that macro-cell C-Plane is aggregated as PCell and small cell U-Plane is aggregated as a SCell. Between PCell and SCell may connect via X2 interface or a new backhaul interface so that the processor 1151 may be included in the macro-cell and/or the small cell.

In addition to, the processor 1151 may configure a Restricted subframe set to indicate for the UE to not transmit or expect downlink data on least one subframe or a subset of subframes configured by the macro cell those. This set can be RRM restrict measurement set and it is transmitted on the measurement object for the inter-frequency measurement configured for the UE.

Whereas, an wireless device 1160 includes a processor 1161, a memory 1162, and an RF unit 1163. The memory 1162 is coupled to the processor 1161, and stores a variety of information for driving the processor 1161. The RF unit 1163 is coupled to the processor 1161, and transmits and/or receives a radio signal. The processor 1161 implements the proposed functions, procedures, and/or methods. In the embodiments of the FIG. 2 to FIG. 10, the operation of the UE can be implemented by the processor 1161.

Especially, the processor 1161 may configure a measurement object for inter-frequency measurement and perform the inter-frequency measurement by DCI or higher layer signaling. The trigger signal may include aperiodic CSI request. The trigger signal may be transmitted in PDCCH/EPDDCH. The processor 1161 may determine small cell discovery parameters such as a center frequency, a measurement period, desired SINR threshold, a number of required reports, desired load, desired QoS level, and a threshold or selection criteria for RRM measurement, etc. The processor 1161 may set RRM measurement and report RRM results. The processor 1161 may configure to receive and determine the discovery channel using the PSS/SSS and/or a new discovery channel via a small cell or a macro cell selectively by confirming the heavy load of the small cell.

Also the processor 1161 may configure to receive and determine SI of U-Plane CC via the small cell or SI of C-Plane CC via the macro cell by controlling selectively, herein the SI on small cell is consist of the C-RNTI assigned by C-Plane or new ID. That is, the processor 1161 may assume that system information between PCell and SCell are the same or different. And the SI may be transmitted in PBCH, CSS ePDCCH, or USS PDSCH and signaled by PBCH/MIB or linked to cell ID, the processor 1161 may determine the SI to detect a corresponding channel or signal according to applied approach. Furthermore, the processor 1161 may determine RRC signaling on SCell via the PCell or the Scell according to applied scheme.

In addition to, the processor 1161 may determine whether a subframe is included in a restricted measurement set to not transmit or expect downlink data on least one subframe or a subset of subframes configured by the macro cell when a subframe of the PCell UL in FDD shares SCell UL/DL in TDD on the same frequency. So, the processor 1151 may configure a Restricted subframe set to indicate for the UE to not transmit or expect downlink data on least one subframe or a subset of subframes configured by the macro cell those. This set can be RRM restrict measurement set and it is transmitted on the measurement object for the inter-frequency measurement configured for the UE. so the processor 1151 may determine whether the subframe is included in the restricted measurement set. The restricted measurement set is received on the measurement object for the inter-frequency measurement configured by eNB. Herein the measurement object includes a threshold or selection criteria for a radio resource management (RRM) report. Also, the processor 1151 may determines to monitor radio resource on a PCell at the at least one subframe. This includes that the processor 1151 checks and calculates a subframe for the restricted measurement set without receiving a signal additionally to use or not use the subset of subframes from the eNB.

That is, the processor 1151 determines whether at least one subframe in a radio frame is reserved for the macro cell, and whether the at least one subframe is configured for a restricted radio resource management (RRM) measurement for a SCell, and determines to perform radio resource monitoring on a PCell not by using the at least one subframe for the downlink or uplink transmission of the small cell, wherein the restricted RRM measurement for a SCell can be configured from the measurement object for the inter-frequency measurement.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for supporting a control plane (C-plane) and a user plane (U-plane) in a wireless communication system supporting multiple carriers, performed by a wireless device, the method comprising:
   receiving a signal to initiate inter-frequency measurement from a macro cell;
   performing the inter-frequency measurement;
   determining to configure a small cell for data transmission based on the inter-frequency measurement,
   wherein the macro cell for the C-plane is aggregated as a primary serving cell (PCell), and the small cell for the U-plane is aggregated as a secondary serving cell (SCell),
   wherein the PCell and the SCell are connected via X2 or Xa interface;
   receiving system information of the small cell for the U-plane via the macro cell for the C-plane,
   wherein the system information of the small cell for the U-plane is assigned by the C-plane with one of a Cell Radio Network Temporary Identifier (C-RNTI) and a new Identifier (ID) for the U-Plane selection; and
   determining whether the system information between a primary serving cell (PCell) and a secondary serving cell (SCell) are same or different.

2. The method of claim 1, further comprising:
   configuring a measurement object for the inter-frequency measurement from the signal, and triggering the inter-frequency measurement by receiving a downlink control information (DCI) through a physical downlink control channel (PDCCH) or optionally an Enhanced PDCCH (EPDDCH).

3. The method of claim 2, further comprising:
performing the inter-frequency measurement for a duration C after triggering the inter-frequency measurement at n+4th subframe, and herein the C is greater than 5 msec.

4. The method of claim 2, the receiving the signal comprising:
the signal includes at least one of a center frequency, a measurement period, a Signal to Interference plus Noise Ratio(SINR) threshold, a number of reports, a desired load, a desired QoS level.

5. The method of claim 2, the configuring step further comprising:
setting a threshold or a selection criteria for a radio resource management (RRM) report from the signal.

6. The method of claim 1, further comprising:
determining information including a load information or an quality related information to be used a cell selection for the U-Plane, and
wherein the information is transmitted by a discovery channel via the macro cell or the small cell selectively by confirming load of the small cell.

7. The method of claim 6, further comprising:
determining to use the information to prune a choice of the small cell for the U-plane before reporting the cell selection result to the macro cell for the C-plane.

8. The method of claim 1, further comprising:
determining to reuse uplink frequency of the macro cell for downlink and/or uplink transmission of the small cell.

9. The method of claim 8, further comprising:
the small cell is applied to Time Division Duplex(TDD) scheme.

10. The method of claim 8, further comprising:
determining to not transmit data transmission on a subset of subframes configured by the macro cell.

11. The method of claim 10, the determining further comprising:
determining whether at least one subframe in a radio frame is reserved for the macro cell, and
determining to not use for the downlink or uplink transmission of the small cell,
wherein the at least one subframe is reserved for the macro cell to transmit uplink transmission, the uplink transmission includes an Hybrid Automatic Repeat Request (HARQ) acknowledgement (ACK)/not-acknowledgement (NACK) or Channel State Information (CSI).

12. The method of claim 10, the determining further comprising:
determining whether at least one subframe in a radio frame is reserved for the macro cell,
determining whether the at least one subframe is configured for a restricted radio resource management (RRM) measurement for the SCell, and
determining to perform radio resource monitoring on the PCell not by using the at least one subframe for the downlink or uplink transmission of the small cell,
wherein the restricted RRM measurement for the SCell is configured from the measurement object for the inter-frequency measurement.

13. A wireless device for supporting a control plane (C-plane) and a user plane (U-plane) in a wireless communication system supporting multiple carriers, comprising:
a radio frequency unit for receiving a radio signal; and
a processor, operatively coupled with the radio frequency unit, configured to:
receive a signal to initiate inter-frequency measurement from a macro cell,
perform the inter-frequency measurement, and
determine to configure a small cell for data transmission based on the inter-frequency measurement,
wherein the macro cell for the C-plane is aggregated as a primary serving cell (PCell), and the small cell for the U-plane is aggregated as a secondary serving cell (SCell),
wherein the PCell and the SCell are connected via X2 or Xa interface,
receive system information of the small cell for the U-plane via the macro cell for the C-plane,
wherein the system information of the small cell for the U-plane is assigned by the C-plane with one of a Cell Radio Network Temporary Identifier (C-RNTI) and a new Identifier (ID) for the U-Plane selection, and
determine whether the system information between a primary serving cell (PCell) and a secondary serving cell (SCell) are same or different.

* * * * *